United States Patent
Bai et al.

(10) Patent No.: US 12,356,337 B2
(45) Date of Patent: Jul. 8, 2025

(54) MACHINE LEARNING-BASED POWER CONTROL

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 17/503,119

(22) Filed: Oct. 15, 2021

(65) Prior Publication Data

US 2022/0124634 A1 Apr. 21, 2022

Related U.S. Application Data

(60) Provisional application No. 63/093,086, filed on Oct. 16, 2020.

(51) Int. Cl.
| | |
|---|---|
| *H04W 52/08* | (2009.01) |
| *H04L 5/00* | (2006.01) |
| *H04W 24/08* | (2009.01) |
| *H04W 52/14* | (2009.01) |
| *H04W 52/24* | (2009.01) |

(52) U.S. Cl.
CPC ......... *H04W 52/242* (2013.01); *H04L 5/0048* (2013.01); *H04W 24/08* (2013.01); *H04W 52/146* (2013.01)

(58) Field of Classification Search
CPC ..... H04W 52/08; H04W 48/12; H04W 52/10; H04W 72/542
See application file for complete search history.

(56) References Cited

U.S. PATENT DOCUMENTS

| | | | |
|---|---|---|---|
| 2020/0169895 A1* | 5/2020 | Chen | G06N 3/045 |
| 2021/0345410 A1* | 11/2021 | Zhou | H04W 52/50 |
| 2022/0279450 A1* | 9/2022 | Zhang | H04W 52/242 |
| 2022/0294514 A1* | 9/2022 | Kang | H04L 5/005 |

* cited by examiner

*Primary Examiner* — Tu X Nguyen
(74) *Attorney, Agent, or Firm* — Seyfarth Shaw LLP

(57) ABSTRACT

A method of wireless communication performed at a user equipment (UE) includes receiving, at the UE, a set of downlink (DL) reference signals (RSs) associated with one or more first transmission beams. The method also includes measuring, at the UE, the set of DL-RSs. The method further includes performing, at the UE, an uplink transmission having a transmission power that is set by a pathloss estimation function based on a set of pathloss parameters. One or more of pathloss parameters of the set of pathloss parameters is based on measuring the set of DL-RSs.

16 Claims, 12 Drawing Sheets

MACHINE LEARNING-BASED POWER CONTROL

CROSS-REFERENCE TO RELATED APPLICATION

The present application claims the benefit of U.S. Provisional Patent Application No. 63/093,086, filed on Oct. 16, 2020, and titled "MACHINE LEARNING-BASED POWER CONTROL," the disclosure of which is expressly incorporated by reference in its entirety.

FIELD OF THE DISCLOSURE

Aspects of the present disclosure generally relate to wireless communications, and more particularly to techniques and apparatuses for machine learning-based power control.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

In conventional systems, a UE determines an uplink (UL) transmission power based on a pathloss (PL) measured from a configured downlink (DL) pathloss-reference signal (PL-RS) corresponding to an uplink beam. In some examples, the pathloss may be determined by averaging or filtering a reference signal received power (RSRP) of the PL-RS. As an example, a layer 1 (L1) RSRP (e.g., unfiltered RSRP) may be used for an L1-RSRP report for beam management.

SUMMARY

In one aspect of the present disclosure, a method for wireless communication at a user equipment (UE) is disclosed. The method includes receiving a set of downlink (DL) reference signals (RSs) associated with one or more first transmission beams. The method also includes measuring the set of DL-RSs. The method further includes performing an uplink transmission having a transmission power that is set by a pathloss estimation function based on a set of pathloss parameters. One or more of pathloss parameters of the set of pathloss parameters may be based on the set of measured DL-RSs.

Another aspect of the present disclosure is directed to an apparatus including means for receiving a set of DL-RSs associated with one or more first transmission beams. The apparatus also includes means for measuring the set of DL-RSs. The apparatus further includes means for performing an uplink transmission having a transmission power that is set by a pathloss estimation function based on a set of pathloss parameters. One or more of pathloss parameters of the set of pathloss parameters may be based on the set of measured DL-RSs.

In another aspect of the present disclosure, a non-transitory computer-readable medium with non-transitory program code recorded thereon is disclosed. The program code is for wireless communication by a UE. The program code is executed by a processor and includes program code to receive a set of DL-RSs associated with one or more first transmission beams. The program code further includes program code to measure the set of DL-RSs. The program code still further includes program code to perform an uplink transmission having a transmission power that is set by a pathloss estimation function based on a set of pathloss parameters. One or more of pathloss parameters of the set of pathloss parameters may be based on the set of measured DL-RSs.

Another aspect of the present disclosure is directed to an apparatus. The apparatus having a memory, one or more processors coupled to the memory, and instructions stored in the memory. The instructions being operable, when executed by the processor, to cause the apparatus to receive a set of DL-RSs associated with one or more first transmission beams. Execution of the instructions also cause the apparatus to measure the set of DL-RSs. Execution of the instructions additionally cause the apparatus to perform an uplink transmission having a transmission power that is set by a pathloss estimation function based on a set of pathloss parameters. One or more of pathloss parameters of the set of pathloss parameters may be based on the set of measured DL-RSs.

In one aspect of the present disclosure, a method for wireless communication at a base station is disclosed. The method includes receiving a channel measurement report from a UE. The method also includes determining parameters of a pathloss estimation function based on the channel measurement report. The method further includes transmitting the parameters of the pathloss estimation function based on determining the parameters.

Another aspect of the present disclosure is directed to an apparatus including means for receiving a channel measurement report from a UE. The apparatus also includes means for determining parameters of a pathloss estimation function based on the channel measurement report. The apparatus further includes means for transmitting the parameters of the pathloss estimation function based on determining the parameters.

In another aspect of the present disclosure, a non-transitory computer-readable medium with non-transitory program code recorded thereon is disclosed. The program code is for wireless communication by a base station. The program code is executed by a processor and includes program code to receive a channel measurement report from a UE. The program code also includes program code to determine parameters of a pathloss estimation function based on the channel measurement report. The program code further includes program code to transmit the parameters of the pathloss estimation function based on determining the parameters.

Another aspect of the present disclosure is directed to an apparatus. The apparatus having a memory, one or more processors coupled to the memory, and instructions stored in the memory. The instructions being operable, when executed by the processor, to cause the apparatus to receive a channel measurement report from a UE. Execution of the instructions also cause the apparatus to determine parameters of a pathloss estimation function based on the channel measurement report. Execution of the instructions additionally cause the apparatus to transmit the parameters of the pathloss estimation function based on determining the parameters.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
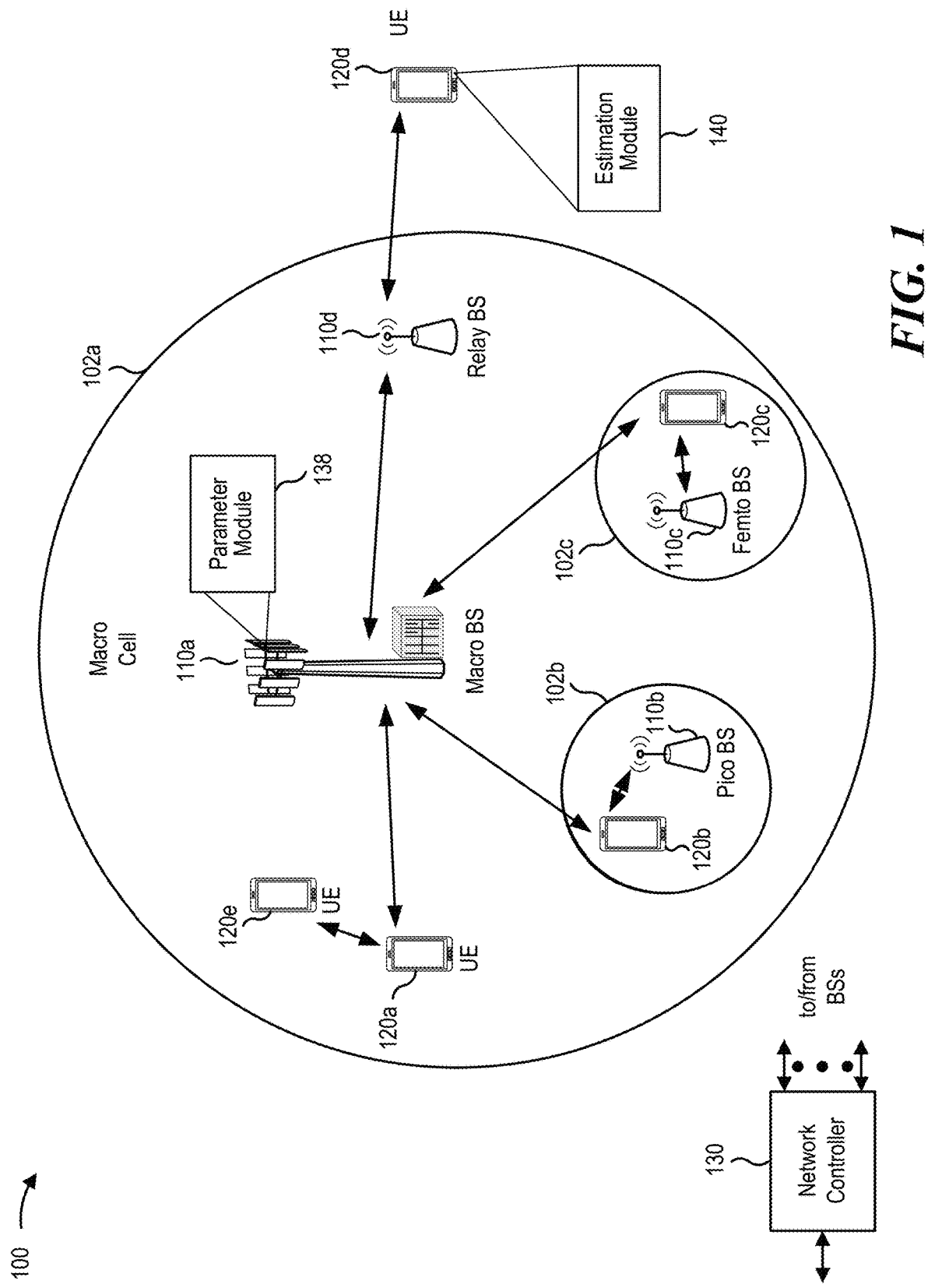
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As discussed, in conventional systems, a user equipment (UE) determines an uplink (UL) transmission power based on a pathloss (PL) measured from a configured downlink (DL) pathloss-reference signal (PL-RS) corresponding to an uplink beam. In some examples, the pathloss may be determined by averaging or filtering a reference signal received power (RSRP) of the PL-RS. As an example, a layer 1 (L1) RSRP (e.g., unfiltered RSRP) may be used for an L1-RSRP report for beam management. In some scenarios, the PL-RS measurement may increase the use of system (e.g., UE) resources and/or increase network overhead. For example, in a high speed train scenario, the PL-RS may be frequently measured to track the pathloss. The frequent measurements may increase network overhead and increase the UE power consumption. In dense deployment scenarios, the UE may connect to multiple base stations, such as multiple transmit and receive points (TRPs) and/or multiple base stations, via multiple uplink beams. The uplink beams may change over time. Additionally, some uplink beams may not have a corresponding downlink transmission, such as a downlink data transmission. Therefore, measuring the pathloss for all potential uplink beams may be costly. Furthermore, a number of PL-RSs measurable by the UE may be limited. The number of PL-RSs may be configured by a maximum PL-RS parameter. It may be desirable to use a measurement of a first beam to predict a pathloss of a second beam.

Various aspects disclosed relate generally to estimating a pathloss of one or more uplink beams (e.g., uplink transmissions) using a network configured pathloss estimation function, based on a set of determined pathloss values. Some aspects more specifically relate to measuring a first beam to predict a pathloss of a second beam. In such aspects, the first beam may operate within a different band than a band associated with the second beam. Additionally, or alternatively, the first beam may be associated with a physical cell identifier (PCI) or a transmission configuration indicator (TCI) state that is different from a PCI or TCI state associated with the second beam. In some examples, a pathloss estimation function may use a set of pathloss parameters to estimate the pathloss of the second beam. One or more pathloss parameters of the set of pathloss parameters may be based on the measurement of the first beam, such as a measurement of a downlink reference signal. In such examples, a power control function may determine an uplink transmission power based on the estimated pathloss of the second beam. The estimated pathloss may be a filtered value that may be different from an L1-RSRP. Conventional wireless systems may be limited to using a measured pathloss of the second beam instead of the pathloss of the second beam that is estimated based on the measurement of a first beam. The pathloss estimation function may be implemented with a machine learning model (e.g., artificial neural network) at the UE.

In some other aspects, the pathloss estimation function may use a set of pathloss parameters to estimate an uplink transmission power based on a measurement of a first beam, such as an RSRP of the first beam. In some examples, one or more pathloss parameters of the set of pathloss parameters may be received from a base station.

Various aspects of the present disclosure may specify new signaling capabilities for one or both of the UE and the base station to facilitate directly, or indirectly, determining an uplink transmission power of an uplink transmission associated with the second beam based on a measurement of the first beam. The signaling may configure the UE to determine the uplink transmission power of the uplink transmission associated with the second beam based on the measurement of the first beam. Additionally, or alternatively, the UE may signal a capability to determine the uplink transmission power of the uplink transmission associated with the second beam based on the measurement of the first beam. Other types of signaling between the base station and the UE are contemplated to facilitate various aspects of the present disclosure.

Particular aspects of the subject matter described in this disclosure may be implemented to realize one or more of the following potential advantages. In some examples, the described techniques may reduce latency by predicting a pathloss and/or transmission power of a future uplink transmission based on one or more measurements of a downlink transmission. In contrast, conventional systems configure a new pathloss to a new uplink beam when an uplink transmission is scheduled on a new uplink beam without prior pathloss tracking. In such systems, the UE may perform multiple measurements of a pathloss reference signal to determine a pathloss value. Additionally, in some conventional systems, the base station may be configured to periodically transmit a downlink reference signal for one or more uplink beams for a UE to measure a pathloss reference signal. In some examples, the described techniques may reduce reference signal overhead because a UE may be specified to track one or more beams, such as a synchronization signal block (SSB), having a longer periodicity. Additionally, the UE may reduce power consumption by tracking one or more beams having a longer periodicity.

Furthermore, in some conventional systems, a UE may be configured with sixty-four UL beam directions. In such systems, the UE may only receive four pathloss reference signals per transmission instance. In some such systems, an uplink beam direction may not be associated with a dedicated pathloss reference signal. Additionally, a pathloss estimation from a misaligned pathloss reference signal may be inaccurate. In some examples, the described techniques may improve pathloss predictions and also improve power control functions, even if a number of tracked pathloss reference signals is less than a number of UL beams.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include an estimation module 140. For brevity, only one UE 120d is shown as including the estimation module 140. The estimation module 140 may receive a set of downlink (DL) reference signals (RSs) associated with one or more first transmission beams; measure the set of DL-RSs; and perform an uplink transmission having a transmission power that is set by a pathloss estimation function based on a set of pathloss parameters, in which one or more of pathloss parameters of the set of pathloss parameters are based on measuring the set of DL-RSs.

The base stations 110 may include a parameter module 138. For brevity, only one base station 110a is shown as including the parameter module 138. The parameter module 138 may receive a channel measurement report from a UE 120; determine parameters of a pathloss estimation function based on the channel measurement report; and transmit the parameters of the pathloss estimation function based on determining the parameters.

As indicated above, FIG. 1 is provided merely as an example. Other examples may differ from what is described with regard to FIG. 1.

Figure 2:
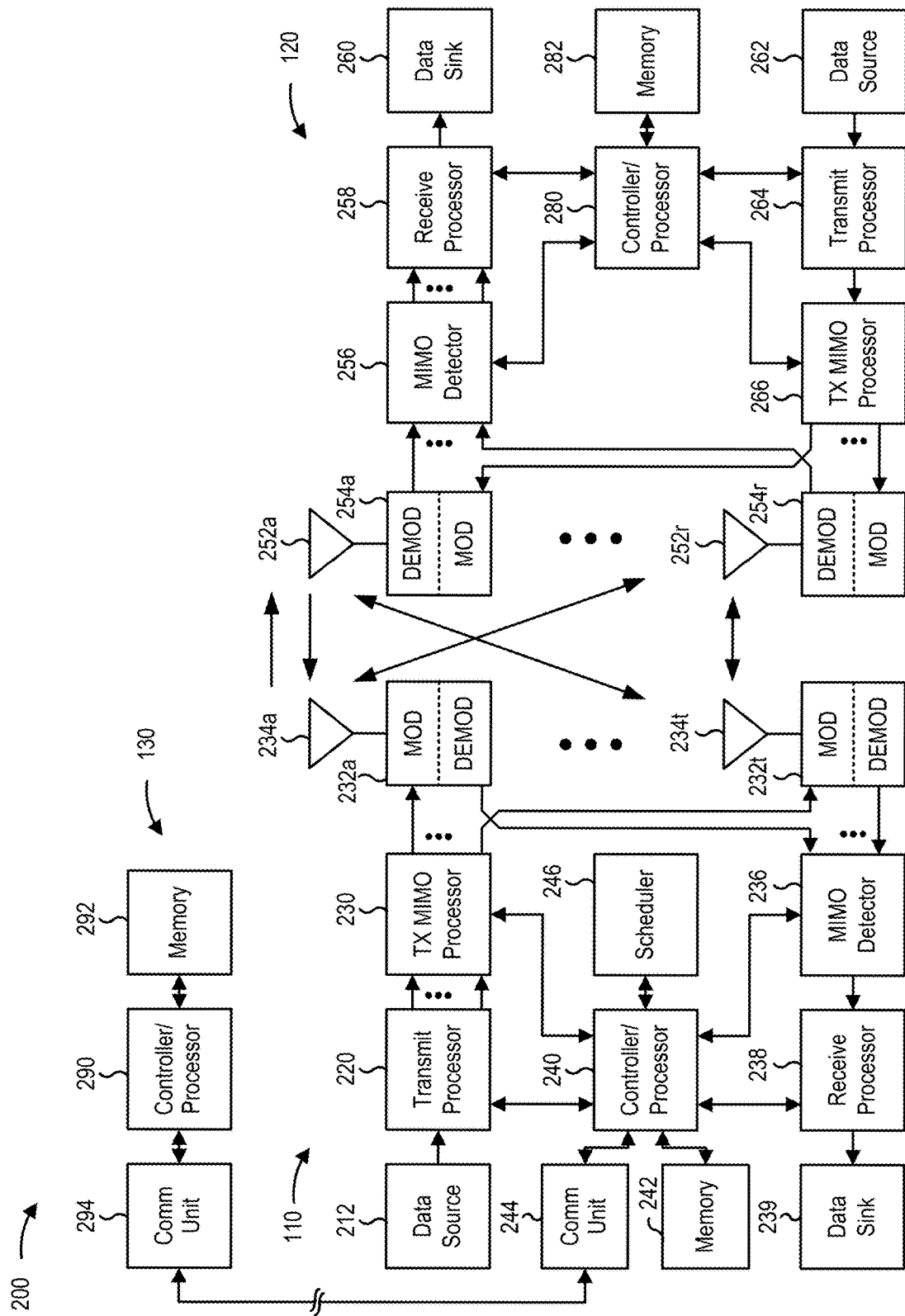
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for estimating a pathloss as described in more detail elsewhere. For example, the controller/processor 240 of the base station 110, the controller/processor 280 of the UE 120, and/or any other component(s) of FIG. 2 may perform or direct operations of, for example, the processes of FIGS. 9-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining a set of pathloss values based on a set of downlink (DL) reference signal (RS); means for estimating a pathloss of an uplink transmission based on the set of pathloss values; and means for determining a transmission power of the uplink transmission based on estimating the pathloss of the uplink transmission. In some aspects, the base station 110 may include means for receiving a channel measurement report from a UE; means for determining parameters of a pathloss estimation function based on the channel measurement report; and means for transmitting the parameters of the pathloss estimation function in response to determining the parameters. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
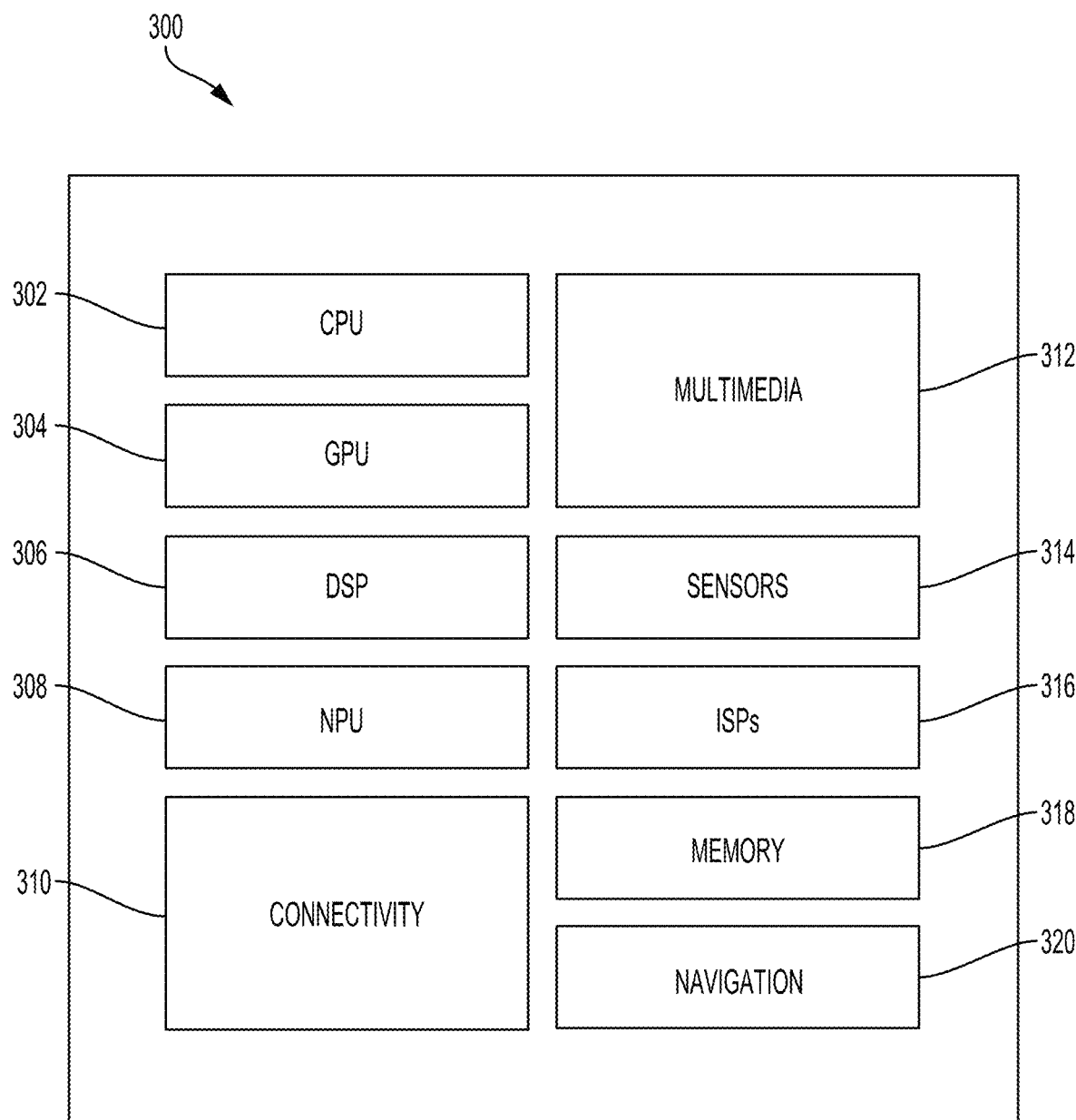
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for machine learning to estimate a pathloss, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive a set of downlink (DL) reference signals (RSs) associated with one or more first transmission beams; code to measure the set of DL-RSs; and code to perform an uplink transmission having a transmission power that is set by a pathloss estimation function based on a set of pathloss parameters. Additionally, or alternatively, the instructions loaded into the general-purpose processor 302 may comprise code to receive a channel measurement report from a UE; code to determine parameters of a pathloss estimation function based on the channel measurement report; and code to transmit the parameters of the pathloss estimation function in response to determining the parameters.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
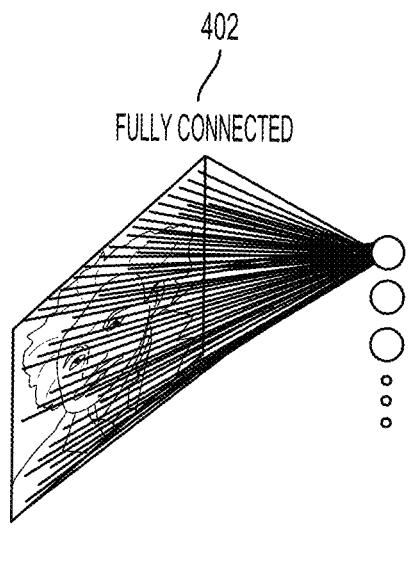
FIGS. 4A, 4B, and 4C are diagrams illustrating a neural network, in accordance with aspects of the present disclosure.
Figure 4B:
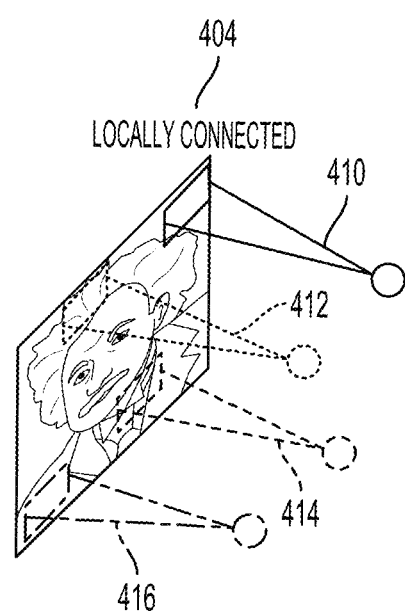

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
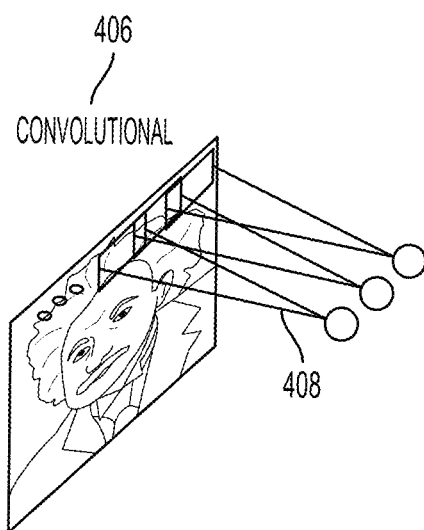

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
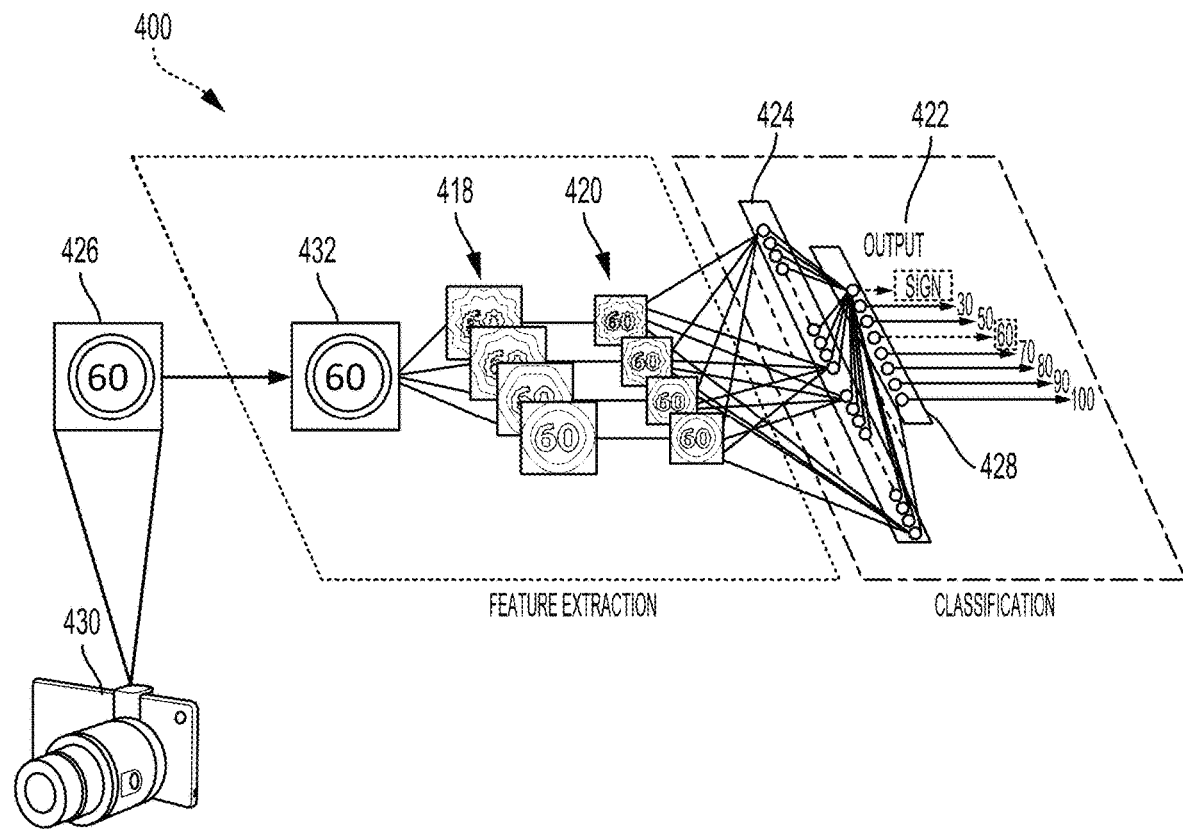
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
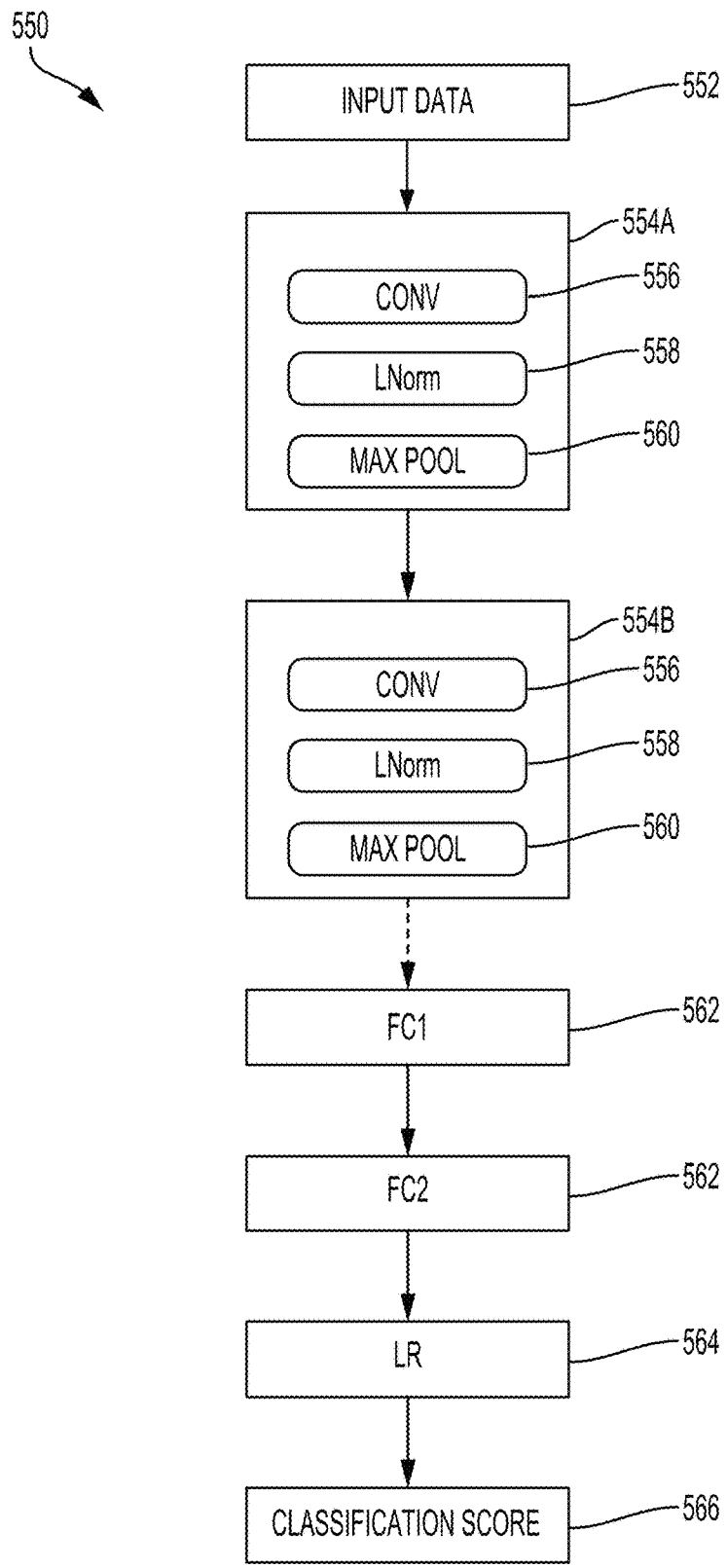
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

In most cases, a user equipment (UE) determines power for an uplink (UL) transmission based on a pathloss (PL). That is, the PL may be one variable of a set of variables for determining a UL transmission power. In millimeter wave (mmWave) systems, the PL may be different for different beams. In one example, the PL is determined based on a measurement of a pathloss reference signal (PL-RS), such as a channel state information-reference signal (CSI-RS) or a synchronization signal block (SSB). The PL-RS is a type of downlink (DL) reference signal. In some cases, the PL-RS (e.g., CSI-RS or SSB) may be linked to a sounding reference signal (SRS) resource, indexed by an SRS resource indicator (SRI). When the SRI schedules a physical uplink shared channel (PUSCH), the uplink transmission power of the PUSCH may be based on the PL determined from a measurement of the PL-RS. If the PL-RS is not configured, the default beam (e.g., the SSB that obtained a master information block (MIB)) may be measured to determine the PL.

Figure 6:
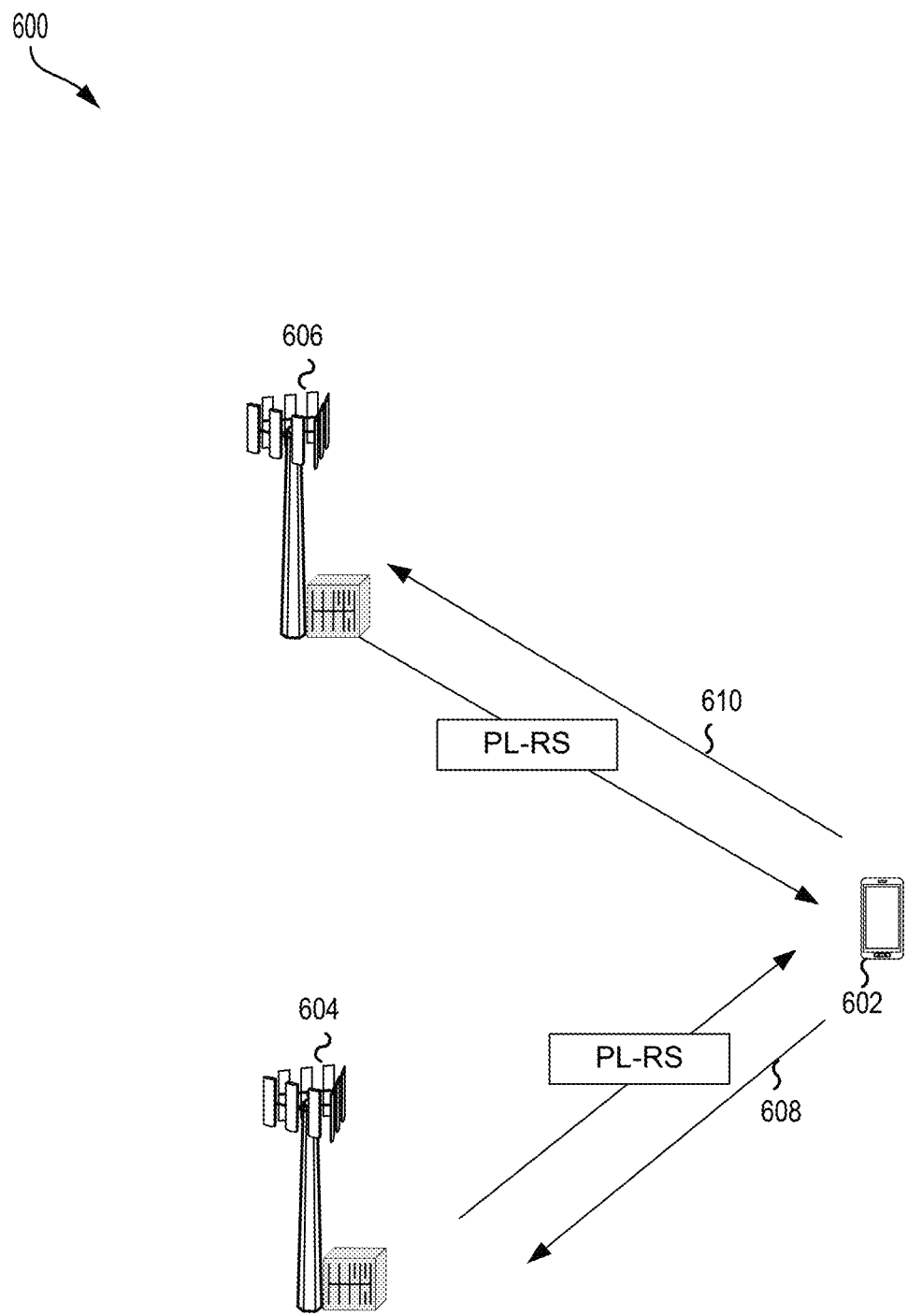
FIG. 6 is a block diagram illustrating an example of receiving pathloss reference signals, in accordance with aspects of the present disclosure.

FIG. 6 is a block diagram 600 illustrating an example of receiving pathloss reference signals, in accordance with aspects of the present disclosure. In the example of FIG. 6, a UE 602 may be an example of a UE 120 described with reference to FIGS. 1 and 2. Additionally, base stations 604, 606 may each be an example of one of the base stations 110 described with reference to FIGS. 1 and 2. As shown in FIG. 6, a UE 602 may receive PL-RSs from a first base station (e.g., gNB) 604 and a second base station 606. The UE 602 may determine a pathloss for a first uplink beam 608 to the first base station 604 based on a measurement of the PL-RS received from the first base station 604. A transmission power for the first uplink beam 608 may be determined based on the determined pathloss. Additionally, the UE 602 may determine a pathloss for a second uplink beam 610 to the second base station 606 based on a measurement of the PL-RS received from the second base station 606. A transmission power for the second uplink beam 610 may be determined based on the determined pathloss.

As shown in EQUATION 1, the pathloss $PL_{b,f,c}(q_d)$ may be one of the parameters used for determining a transmission power for a physical uplink shared channel (PUSCH) $P_{PUSCH}$. The measured pathloss may also be a parameter for determining a transmission power for a physical uplink control channel (PUCCH) and a sounding reference signal (SRS):

$$P_{PUSCH,b,f,c}(i, j, q_d, \ell) = \min\begin{cases} P_{CMAX,f,c}(i), \\ P_{O\_PUSCH,b,f,c}(j) + 10\log_{10}(2^\mu M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, \ell) \end{cases} \quad (1)$$

In EQUATION 1, $P_{O\_PUSCH}$ represents a parameter value preset from a base station, a represents a fractional pathloss compensation factor, PL represents a downlink pathloss estimate determined at the UE using an RS index $q_d$ for an active downlink (DL) BWP, and $\Delta_{TF}$ represents an offset dependent on a modulation and coding scheme (MCS). In some examples, a set of RS configurations for a number of RS resources is provided by a higher layer parameter PUSCH-PathlossReferenceRS. $P_{CMAX,f,c}(i)$ represents a maximum UE transmit power per uplink carrier f of the serving cell c in the PUSCH transmission occasion i. $M_{RB,b,f,c}^{PUSCH}(i)$ represents a bandwidth of the PUSCH resource assignment expressed in a number of resource blocks for the PUSCH transmission occasion i on the active uplink BWP b of the uplink carrier f of the serving cell c and μ represents a subcarrier spacing (SCS). Additionally, $f_{b,f,c}(i, \ell)$ represents the PUSCH power control adjustment state $\ell$ for the active uplink BWP b of the uplink carrier f of the serving cell c in the PUSCH transmission occasion i, where:

$$f_{b,f,c}(i, \ell) = f_{b,f,c}(i-i_0, \ell) + \Sigma_{m=0}^{|D_i|-1} \delta_{PUSCH,b,f,c}(m, \ell) \quad (2)$$

As shown in EQUATION 2, the PUSCH power control adjustment state $\ell$ ($f_{b,f,c}(i, \ell)$) may be a sum of transmit power control (TPC) command values $\delta_{PUSCH,b,f,c}(m, \ell)$ in a set $D_i$ of TPC command values $\delta_{PUSCH,b,f,c}(m, \ell)$ received at the UE between two reference points. As described above, PL-RS measurements may increase the use of system (e.g., UE) resources and/or increase network overhead. For example, in a high speed train scenario, the PL-RS may be frequently measured to track the pathloss. The frequent measurements may increase network overhead and increase the UE power consumption. In dense deployment scenarios, the UE may connect to multiple base stations, such as multiple transmit and receive points (TRPs) and/or multiple gNBs, with multiple uplink beams. The uplink beams may change over time. Additionally, some uplink beams may not have a corresponding downlink transmission, such as a downlink data transmission. Therefore, measuring the pathloss for all potential uplink beams may be costly. Furthermore, a number of PL-RSs measurable by the UE may be limited. The number of PL-RSs may be configured by a maximum PL-RS parameter. For example, in 3GPP Release 16, a UE may be specified to monitor a maximum of four PL-RSs.

In some cases, a UE may reconfigure a PL-RS. For example, the UE may reconfigure the PL-RS when switching from one base station to another base station when switching UL beams. The reconfiguration increases an accuracy of the determined PL because the PL may not be accurate if the UE uses an outdated PL-RS or a default PL-RS. Additionally, uplink and downlink beams may be different. In some cases, a cell does not transmit downlink traffic. Still, the cell may be specified to transmit a DL-RS to the UE. Thus, the UE may reconfigure the PL-RS when switching beams. The PL-RS reconfigurations may increase latency and/or overhead.

Aspects of the present disclosure configure a pathloss estimation function to estimate (e.g., predict) a pathloss of an uplink beam (e.g., uplink transmission) based on one or more pathloss values determined from one or more DL-RSs. Each determined pathloss value corresponds to one DL-RS. An uplink transmission power for the uplink transmission may be based on the estimated PL. The pathloss estimation function may be implemented as a machine learning model (e.g., an artificial neural network) at a UE. For ease of explanation, the description below uses an artificial neural network as an example of the pathloss estimation function. Still, the pathloss estimation function is not limited to an artificial neural network. Other types of models and/or functions may implement the described features of the pathloss estimation function.

Figure 7:
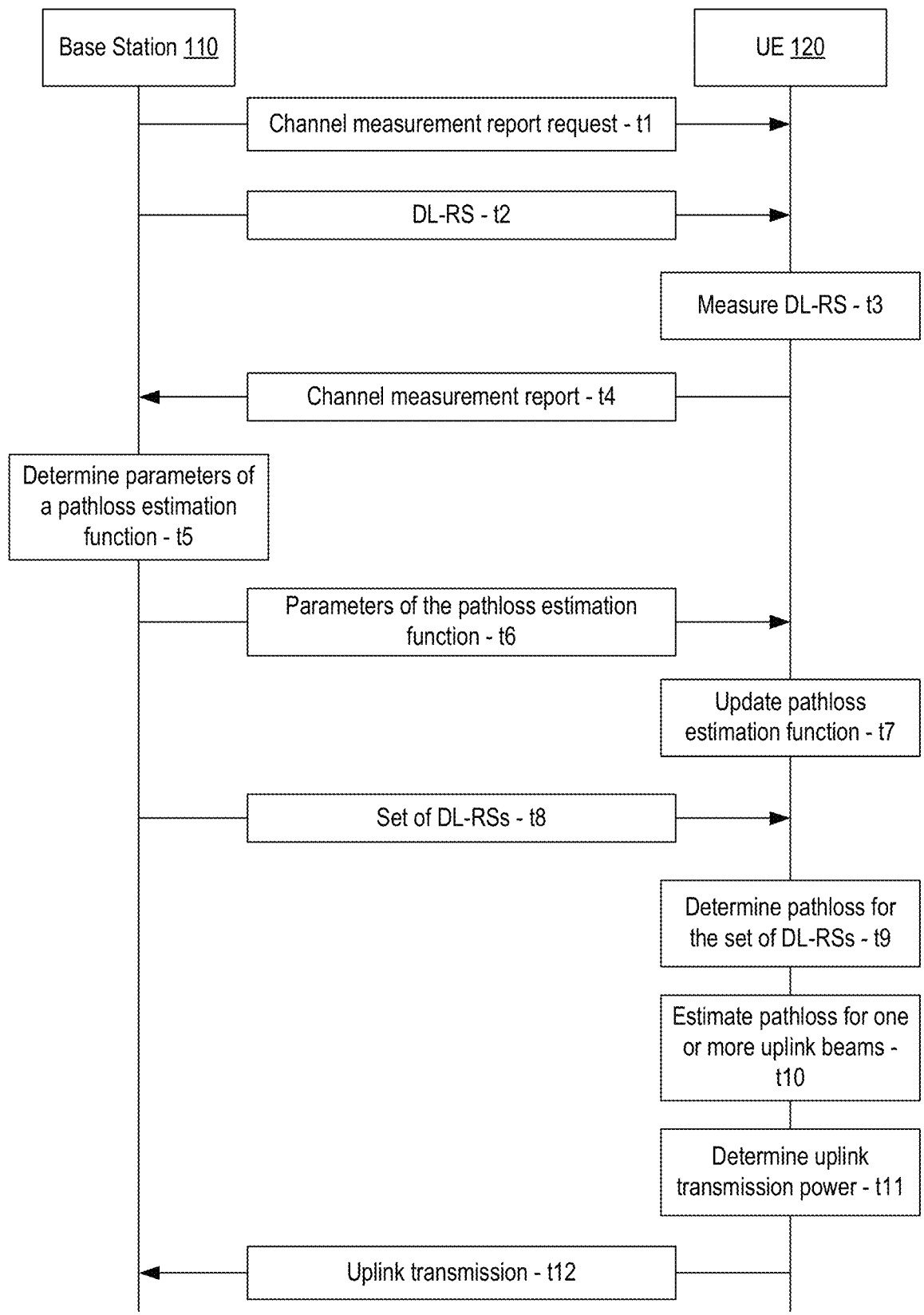
FIG. 7 is a timing diagram illustrating an example of estimating a pathloss of an uplink transmission, in accordance with aspects of the present disclosure.

FIG. 7 is a timing diagram illustrating an example of estimating a pathloss of an uplink transmission, in accordance with aspects of the present disclosure. As shown in FIG. 7, at time t1, a base station 110 transmits, to a UE 120, a request for a channel measurement report. In one configuration, the channel measurement report indicates a pathloss measurement. At time t2, the base station 110 transmits a downlink (DL) reference signal (RS) for a pathloss measurement. The base station 110 may configure the UE 120 for receiving the DL-RS. For example, the base station 110 may configure the UE 120 to receive the DL-RS on one downlink beam of a set of downlink beams. At time t3, the UE 120 may measure the DL-RS and determine a pathloss for an uplink beam based on a measurement of the DL-RS. Additionally, at time t4, the UE 120 may transmit the channel measurement report indicating the pathloss determined based on the measurement of the DL-RS.

Furthermore, as shown in FIG. 7, at time t5, the base station 110 determines parameters of a pathloss estimation function based on the pathloss measurement included in the channel measurement report. As described, the pathloss estimation function may be an artificial neural network (e.g., machine learning model). In one configuration, the parameters may include weights and other parameters of the artificial neural network. As such, the base station 110 may train the artificial neural network based on the pathloss measurement included in the channel measurement report. At time t6, the base station 110 may transmit estimation parameters of the pathloss estimation function to the UE 120. In one configuration, at time t7, the UE 120 may update a pathloss estimation function of the UE 120 based on the estimation parameters received from the base station 110.

As described, the pathloss estimation function may estimate a pathloss for an uplink transmission based on one or more pathloss values (e.g., a set of pathloss values). The set of pathloss values may be determined based on measurements of a set of fixed downlink beams, such as DL-RSs (e.g., synchronization signal block (SSBs)). In the example of FIG. 7, at time t8, the UE 120 receives a set of DL-RSs. The set of DL-RSs may be a fixed set of DL-RSs. The set of DL-RSs may be transmitted at different times. For ease of explanation, FIG. 7 shows the set of DL-RSs transmitted at one time. At time t9, the UE 120 determines a set of pathloss values based on the set of DL-RSs.

At time t10, the pathloss estimation function of the UE 120 estimates a pathloss of one or more uplink beams based on the set of pathloss values. The pathloss estimation function may estimate the pathloss of the uplink transmission based on a set of pathloss parameters. The set of pathloss parameters may include the set of pathloss values determined at time t9, a timing indicator, a blockage indicator associated with blockage identified by the UE 120, and/or an indication of one or more uplink beams. The timing indicator may include a measurement time of each pathloss of the set of pathloss values and a transmission time of the uplink transmission. The measurement time and the transmission time may correspond to different slots of a subframe. In one configuration, the transmission time of the uplink transmission is at a future time (e.g., a time after time t10). The pathloss estimated at time t10 may be the pathloss for the one or more uplink beams indicated in the set of pathloss parameters. The one or more uplink beams may be a subset of the uplink beams configured at the UE 120.

In one aspect, the estimated pathloss includes a set of pathloss values (e.g., a range of pathloss values) and a confidence associated with each pathloss in the set of pathloss values. In one configuration, the set of pathloss parameters also includes a set of power control parameters, a maximum permissible exposure (MPE) indication, a hardware configuration of the UE 120, and a transmission configuration for the uplink transmission as inputs to the pathloss estimation function.

As shown in FIG. 7, at time t11, an uplink transmission power for an uplink transmission may be determined at the UE 120 based on the pathloss estimated by the pathloss estimation function. The uplink transmission power may be determined by an uplink transmission power function of the UE 120, such as the uplink transmission power function of EQUATION 1, or the pathloss estimation function. The uplink transmission power may be based on the pathloss of the one or more uplink beams. At time t12, the UE 120 performs an uplink transmission based on the determined uplink transmission power. The uplink transmission of time t12 may be in a same band, or a different band, than the set of DL-RSs received at time t8. Additionally, the uplink transmission may be a physical uplink shared channel (PUSCH) transmission, a sounding reference signal (SRS) transmission, a physical uplink control channel (PUCCH) transmission, or another type of uplink transmission.

In one configuration, the UE 120 transmits the pathloss estimated at time t10 and an actual pathloss to the base station 110 based on a triggering condition (not shown in FIG. 7). The triggering condition may be a request received from the base station 110 based on the uplink transmission of time t12. For example, the base station 110 may determine a prediction error based on the uplink transmission. In this example, the base station 110 may transmit the request based on determining the prediction error. In another example, the triggering condition may be based on a difference between the pathloss estimated at time t10 and the actual pathloss being greater than a threshold. That is, the UE 120 may transmit the pathloss estimated at time t10 and an actual pathloss to the base station 110 based the difference being greater than the threshold. The base station 110 may update the parameters for the pathloss estimation function (e.g., re-train the pathloss estimation function) based on the estimated pathloss and the actual pathloss received from the UE 120. The base station 110 may then transmit the updated parameters to the UE 120, and the UE 120 may update the pathloss estimation function with the updated parameters.

Figure 8A:
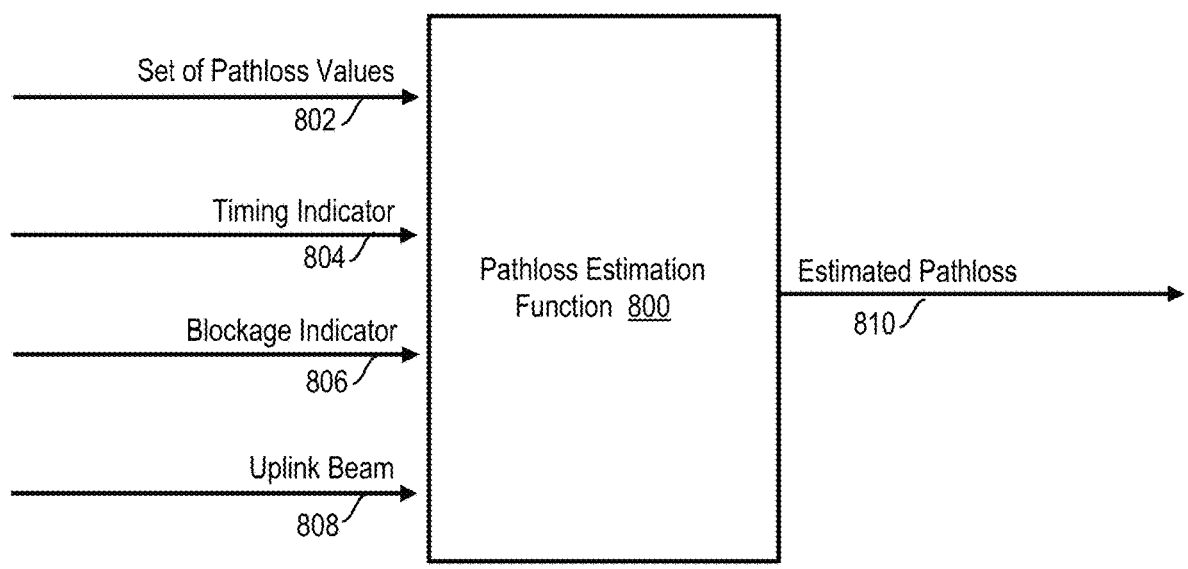
FIG. 8A is a block diagram illustrating an example of the pathloss estimation function, in accordance with aspects of the present disclosure.

As described, a pathloss estimation function may estimate a pathloss based on a set of pathloss parameters provided to the pathloss estimation function. FIG. 8A is a block diagram illustrating an example of a pathloss estimation function 800, in accordance with aspects of the present disclosure. As shown in FIG. 8A, the pathloss estimation function 800 may receive, as an input, a set of pathloss values 802 determined from measurements of a set of downlink beams (e.g., DL-RSs), a timing indicator 804, a blockage indicator 806 associated with blockage identified by a UE, and an indication of one or more uplink beams 808. The timing indicator 804 may include a measurement time of each pathloss value of the set of pathloss values and a transmission time of the uplink transmission. The measurement time and the transmission time may correspond to different slots of a subframe. As shown in FIG. 8A, the pathloss estimation function 800 may estimate a pathloss 810 of the one or more uplink beams 808 (e.g., uplink transmissions) based on the set of pathloss values 802, the timing indicator 804, and the blockage indicator 806. The estimated pathloss 810 may be a set of pathloss values (e.g., a range of pathloss values) and a confidence associated with each of the set of pathloss values. The UE may determine an uplink transmission power of an uplink transmission on the one or more uplink beams 808 based on the estimated pathloss 810.

Figure 8B:
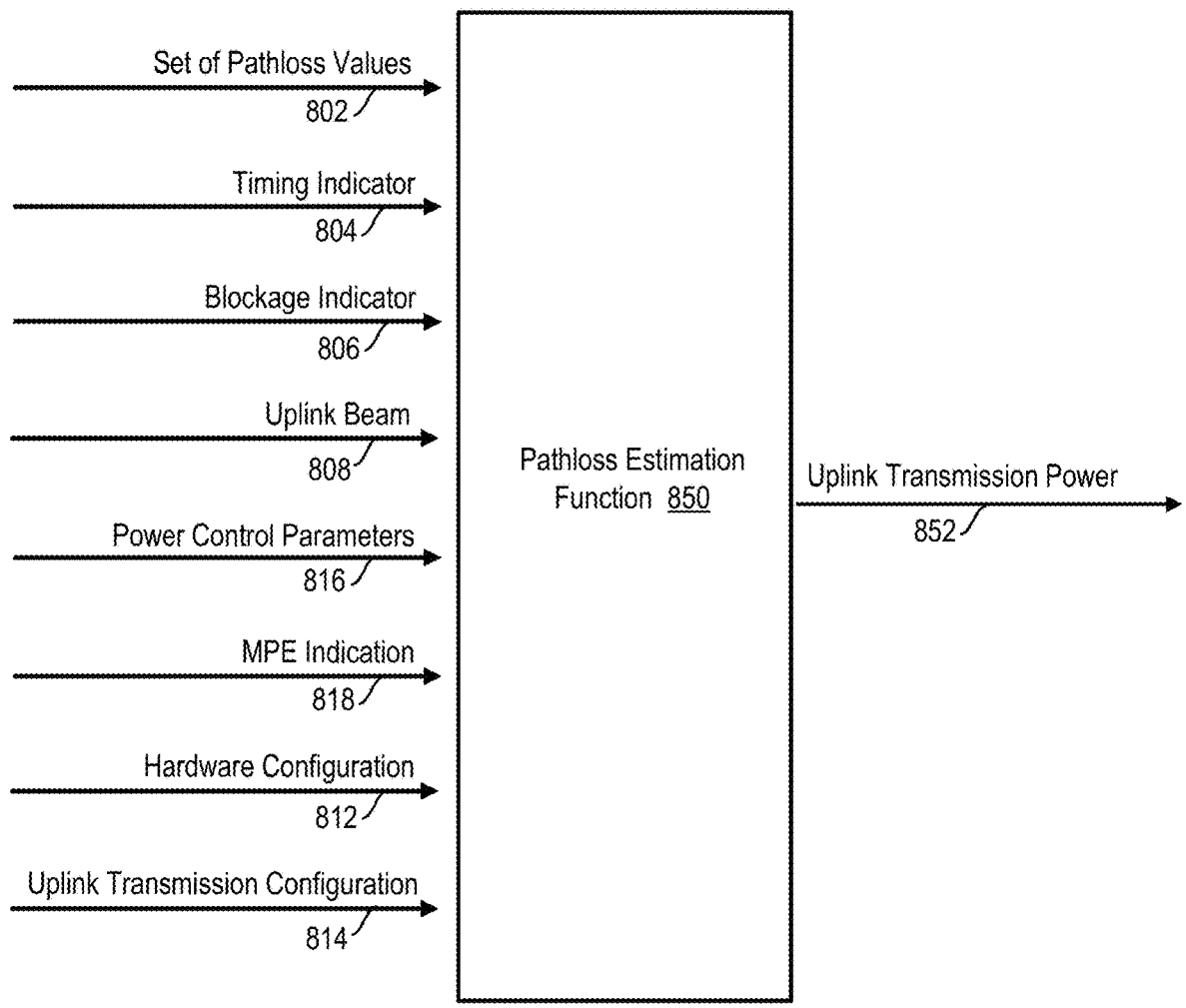
FIG. 8B is a block diagram illustrating an example of the pathloss estimation function, in accordance with aspects of the present disclosure.

FIG. 8B is a block diagram illustrating an example of a pathloss estimation function 850, in accordance with aspects of the present disclosure. As shown in FIG. 8B, the pathloss estimation function 850 may receive, as an input, a set of pathloss values 802 determined from measurements of a set of downlink beams (e.g., DL-RSs), a timing indicator 804, a blockage indicator 806 associated with blockage identified by the UE, an indication of one or more uplink beams 808, a set of power control parameters 816, a maximum permissible exposure (MPE) indication 818, a hardware configuration of the UE 812, and an uplink transmission configuration 814. The transmission configuration 814 may indicate an uplink channel for an uplink transmission and/or a type of uplink transmission, such as a re-transmission or a random access channel transmission. In the example of FIG. 8B, the pathloss estimation function 850 estimates an uplink transmission power 852 for an uplink transmission on the one or more uplink beams 808 based on the received inputs. That is, the uplink transmission power 852 may be estimated by the pathloss estimation function 850 in addition to, or as an alternate from, the uplink transmission power determined based on EQUATION 1.

As described, according to aspects of the present disclosure, a pathloss estimation function estimates a pathloss based on a set of pathloss values determined from measurements of a set of fixed downlink beams, (e.g., synchronization signal block (SSBs)), a timing indication, and a beam indication. The pathloss may be estimated for an uplink beam scheduled between measurements. For example, the pathloss may be predicted for an uplink beam specified for connecting the UE from the current cell to a different cell.

A base station (e.g., gNB) may learn the environment of its coverage area over time. The pathloss of one or more beams may be a fingerprint of a location in the area. The base station may infer the pathloss of other beams or cells based on the UE location and knowledge of the coverage area. In some aspects, a pathloss of a subset of beams in a coverage area may be used to estimate a pathloss of other beams in the coverage area and/or the pathloss of a future beam. In one configuration, cross-band measurement may be specified to estimate the pathloss of a first beam in a first band based on a known pathloss of a second beam in a second band.

The pathloss estimation function may be configured by the base station (e.g., gNB). The pathloss estimation function may be a neural network. The base station trains the pathloss estimation function by collecting data from the UE, and configures the pathloss estimation function at the UE. The base station may request the UE to feedback pathloss measurements to train the pathloss estimation function. The base station may also configure reference signals for the UE to measure the pathloss.

In error cases, the base station may configure the UE to report the estimated pathloss and the actual pathloss. An error may occur when the predicted pathloss is too small, the transmit (Tx) power causes interference with other uplink transmissions, and/or the pathloss is too large and causes a decoding failure due to a low transmit power. The base station may send parameter updates of the pathloss estimation function based on online training (e.g., re-training based on the estimated pathloss and the actual pathloss).

Figure 9:
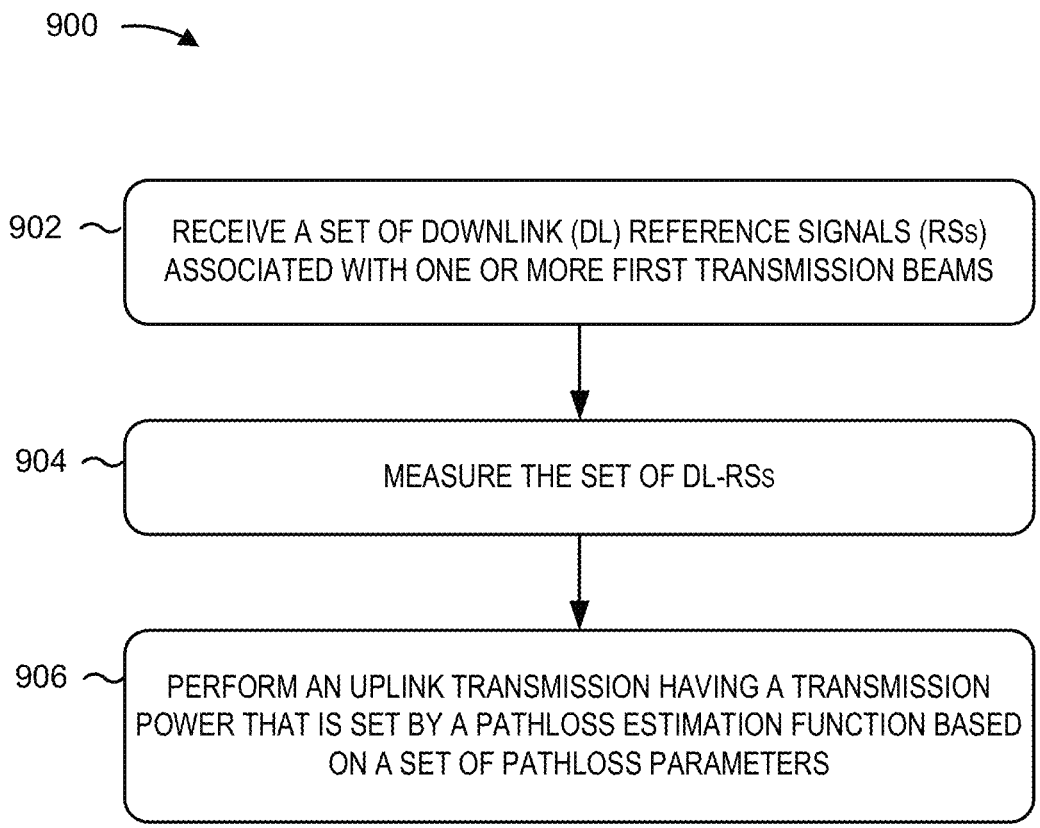
FIG. 9 is a flow diagram illustrating an example process performed, for example, by a user equipment (UE), in accordance with various aspects of the present disclosure.

FIG. 9 is a flow diagram illustrating an example process 900 performed, for example, by a user equipment (UE), in accordance with various aspects of the present disclosure. The UE may be an example of a UE 110 described with reference to FIGS. 1, 2 and 7 or a UE 602 described with reference to FIG. 6. The example process 900 is an example of is an example of machine learning-based power control.

At block 902, the process 900 receives a set of downlink (DL) reference signals (RSs) associated with one or more first transmission beams. Each DL-RS of the set of DL-RSs may be a pathloss RS. At block 904, the process 900, measures the set of DL-RSs. In some examples, one or more of pathloss parameters of a set of pathloss parameters may be based on measuring the set of DL-RSs. Furthermore, at block 906, the process 900 performs an uplink transmission having a transmission power that is set by a pathloss estimation function based on a set of pathloss parameters. In some examples, each DL-RS of the set of DL-RSs is received within a band that is different than a band associated with the uplink transmission. Additionally, or alternatively, each DL-RS of the set of DL-RSs is associated with a physical cell identifier (PCI) that is different than a PCI associated with an uplink transmission from the UE. The uplink transmission may be an uplink shared channel transmission, an uplink control channel transmission, or a sounding reference signal (SRS) transmission.

In some examples, set of pathloss parameters may include a set of pathloss values corresponding to the set of DL-RS, and one or more of a timing indicator, a blockage indicator associated with blockage identified by the UE, or an indication a second transmission beam. The timing indicator may include a measurement time of each pathloss value of the set of pathloss values and a transmission time of the uplink transmission. Additionally, the measurement time and the transmission time correspond to different slots of a subframe. In some such examples, (not shown in FIG. 9), the process 900 estimates, by the pathloss estimation function, a pathloss of the second transmission beam based on the set of pathloss parameters. The transmission power may be determined based on the pathloss of the second transmission beam and the second transmission beam may be an uplink transmission beam. The set of pathloss values may correspond to a first time and the uplink transmission may be performed at a second time after the first time.

In other such examples, the set of pathloss parameters further include one or more of a maximum permissible exposure (MPE) indication, a hardware configuration of the UE, and a transmission configuration for the uplink transmission In some examples, the process 900 receives estimation parameters of the pathloss estimation function from a base station. The pathloss estimation function may be a function performed by an artificial neural network and the estimation parameters may be parameters of the artificial neural network.

Additionally, the process 900 may transmit a report indicating the pathloss of the second transmission beam and an actual pathloss of the second transmission based on satisfying a triggering condition. The process 900 may further receive an update for estimation parameters of the pathloss estimation function based on transmitting the report, and then update the pathloss estimation function based on receiving the update. The actual pathloss may be a time aggregated pathloss that is determined based on measuring the DL-RSs at different times. In some examples, the triggering condition may be satisfied based on receiving a request in response to the uplink transmission, or based on a difference between the pathloss of the second transmission beam and the actual pathloss being greater than a threshold.

In some examples, the process 900 receives, from a base station, a configuration for the set of DL-RSs. In such examples, the process 900 also receives the set of DL-RSs based on receiving the configuration. Each DL-RSs of the set of DL-RSs may be received via a respective first transmission beam of the one or more first transmission beams. Additionally, the one or more first transmission beams may be downlink transmission beams.

Figure 10:
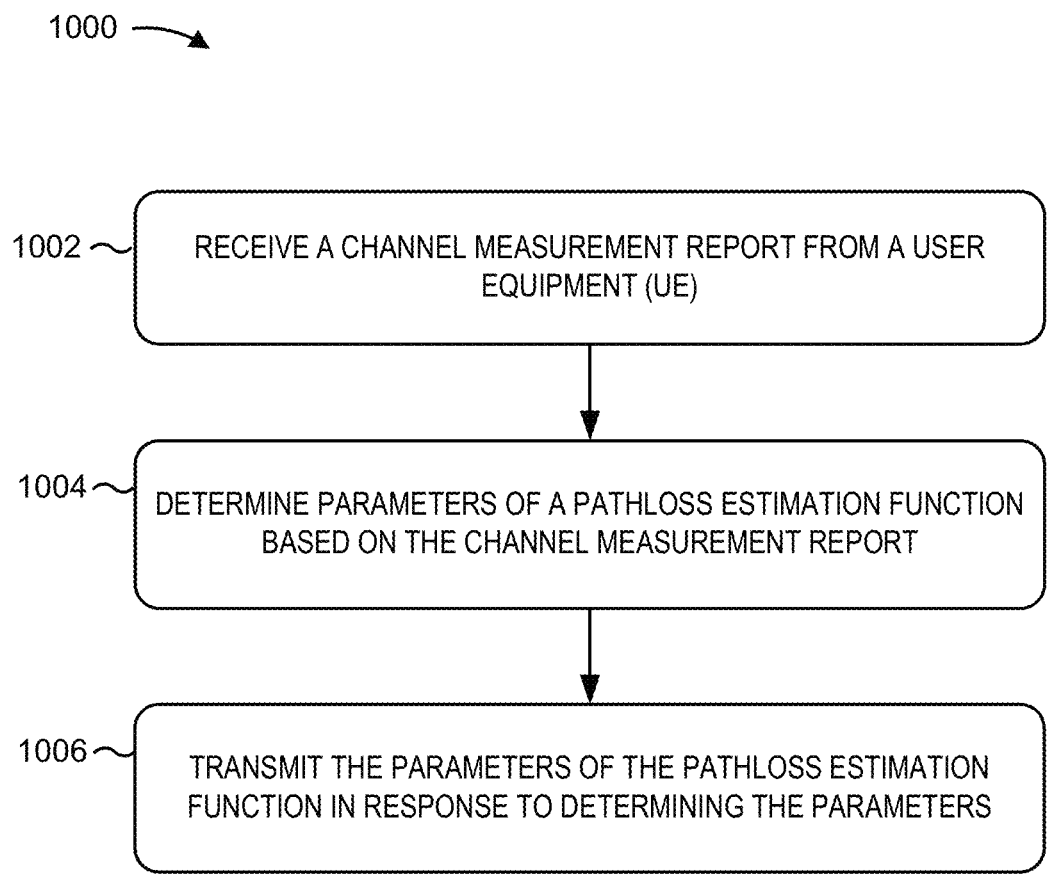
FIG. 10 is a flow diagram illustrating an example process performed, for example, by a base station, in accordance with various aspects of the present disclosure.

FIG. 10 is a flow diagram illustrating an example process 1000 performed, for example, by a base station, in accordance with various aspects of the present disclosure. The base station may be a base station 110 as described with reference to FIGS. 1, 2, and 7 or a base station 604 or 606 as described with reference to FIG. 6. The example process 1000 is an example of machine learning-based power control.

As shown in FIG. 10, the process 1000 begins at block 1002 by receiving a channel measurement report from a first user equipment (UE). In some examples, the process 1000 may also transmit, to the first UE, a request for the channel measurement report. In such examples, the process 1000 may also transmit, to the first UE, a downlink (DL) reference signal (RS) for a pathloss measurement, the channel measurement report comprising the pathloss measurement associated with the DL-RS. The process 1000 may transmit a configuration for the DL-RS to the first UE. The DL-RS may be transmitted via a single downlink beam of a set of downlink beams based on the configuration.

At block 1004, the process 1000 determines parameters of a pathloss estimation function based on the channel measurement report. The pathloss estimation function may be a function of an artificial neural network. At block 1006, the process 1000 transmits the parameters of the pathloss estimation function in response to determining the parameters.

In some examples, the process 1000 may receive an uplink transmission from a first UE and determine a prediction error based on receiving the uplink transmission. The prediction error may be based on the uplink transmission interfering with another uplink transmission of a second UE or a failure to decode the first uplink transmission.

In such examples, the process 1000 may also request a predicted pathloss and an actual pathloss from the first UE in response to determining the prediction error. The process 1000 may then update the parameters based on the predicted pathloss and the actual pathloss, and transmit the updated parameters to the first UE.

Implementation examples are described in the following numbered clauses.

Clause 1. A method for wireless communication performed at a user equipment (UE), comprising: receiving, at the UE, a set of downlink (DL) reference signals (RSs) associated with one or more first transmission beams; measuring, at the UE, the set of DL-RSs; and performing, at the UE, an uplink transmission having a transmission power that is set by a pathloss estimation function based on a set of pathloss parameters, one or more of pathloss parameters of the set of pathloss parameters being based on measuring the set of DL-RSs.

Clause 2. The method of Clause 1, further comprising receiving, from a base station, estimation parameters of the pathloss estimation function.

Clause 3. The method of any one of Clauses 1-2, in which the set of pathloss parameters comprise a set of pathloss values corresponding to the set of DL-RSs, and one or more of a timing indicator, a blockage indicator associated with blockage identified by the UE, or an indication a second transmission beam.

Clause 4. The method of Clause 3, in which: the timing indicator comprises a measurement time of each pathloss value of the set of pathloss values and a transmission time of the uplink transmission; and the measurement time and the transmission time correspond to different slots of a subframe.

Clause 5. The method of Clause 3, in which the method further comprises estimating, by the pathloss estimation function, a pathloss of the second transmission beam based on the set of pathloss parameters, in which: the transmission power is determined based on the pathloss of the second transmission beam; and the second transmission beam is an uplink transmission beam.

Clause 6. The method of Clause 5, further comprising: transmitting a report indicating the pathloss of the second transmission beam and an actual pathloss of the second transmission beam based on satisfying a triggering condition; receiving an update for estimation parameters of the pathloss estimation function based on transmitting the report; and updating the pathloss estimation function based on receiving the update.

Clause 7. The method of Clause 6, in which the triggering condition is satisfied based on: receiving a request in response to the uplink transmission; or a difference between the pathloss of the second transmission beam and the actual pathloss being greater than a threshold.

Clause 8. The method of Clause 3, in which the set of pathloss parameters further comprise one or more of a maximum permissible exposure (MPE) indication, a hardware configuration of the UE, and a transmission configuration for the uplink transmission.

Clause 9. The method of any one of Clauses 1-8, in which the uplink transmission comprises an uplink shared channel transmission, an uplink control channel transmission, or a sounding reference signal (SRS) transmission.

Clause 10. The method of Clause 3, in which: the set of pathloss values correspond to a first time; and the uplink transmission is performed at a second time after the first time.

Clause 11. The method of any one of Clauses 1-10, further comprising: receiving, from a base station, a configuration for the set of DL-RSs; and receiving the set of DL-RSs based on receiving the configuration, each DL-RSs of the set of DL-RSs received via a respective first transmission beam of the one or more first transmission beams, the one or more first transmission beams being downlink transmission beams.

Clause 12. The method of any one of Clauses 1-11, in which each DL-RS of the set of DL-RSs is a pathloss RS.

Clause 13. The method of any one of Clauses 1-12, in which each DL-RS of the set of DL-RSs is received within a band that is different from a band associated with the uplink transmission.

Clause 14. The method of any one of Clauses 1-13, in which each DL-RS of the set of DL-RSs is associated with a physical cell identifier (PCI) or a transmission configuration indicator (TCI) state that is different from a PCI or a TCI state associated with the uplink transmission.

Clause 15. The method of any one of Clauses 1-14, in which the pathloss estimation function is a function associated with an artificial neural network of the UE.

Clause 16. A method for wireless communication performed at a base station, comprising: receiving a channel measurement report from a first user equipment (UE); determining parameters of a pathloss estimation function based on the channel measurement report; and transmitting the parameters of the pathloss estimation function based on determining the parameters.

Clause 17. The method of Clause 16, in which the pathloss estimation function is a function associated with an artificial neural network.

Clause 18. The method of any one of Clauses 16-17, further comprising: transmitting, to the first UE, a request for the channel measurement report; and transmitting, to the first UE, a downlink (DL) reference signal (RS) for a pathloss measurement, the channel measurement report comprising the pathloss measurement associated with the DL-RS.

Clause 19. The method of any one of Clauses 16-18, further comprising: transmitting, to the first UE, a configuration for the DL-RS; and transmitting, to the first UE, the DL-RS via a single downlink beam of a set of downlink beams based on the configuration.

Clause 20. The method of any one of Clauses 16-19, further comprising: determining a prediction error based on a first uplink transmission received from the first UE; requesting a predicted pathloss and an actual pathloss from the first UE in response to determining the prediction error; updating the parameters based on the predicted pathloss and the actual pathloss; and transmitting the updated parameters to the first UE.

Clause 21. The method of Clause 20, further comprising determining the prediction error based on the first uplink transmission interfering with a second uplink transmission of a second UE or a failure to decode the first uplink transmission.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed at a user equipment (UE), comprising:
   receiving, at the UE, weights and parameters for an artificial neural network that executes a pathloss estimation function, the weights and parameters being received in accordance with transmitting a channel measurement report corresponding to one or more first downlink (DL) reference signals (RSS);
   receiving, at the UE, a set of second DL-RSs associated with one or more first transmission beams;
   measuring, at the UE, the set of second DL-RSs; and
   performing, at the UE, an uplink transmission via a physical uplink shared channel (PUSCH) having a transmission power that is set by the pathloss estimation function executed via the artificial neural network at the UE based on a set of pathloss parameters, the set of pathloss parameters including a set of pathloss values corresponding to measurements of the set of second DL-RSs and one or more of a timing indicator, a blockage indicator associated with blockage identified by the UE, or an indication of a second transmission beam.

2. The method of claim 1, in which: the timing indicator comprises a measurement time of each pathloss value of the set of pathloss values and a transmission time of the uplink transmission via the PUSCH; and the measurement time and the transmission time correspond to different slots of a subframe.

3. The method of claim 1, in which the method further comprises estimating, by the pathloss estimation function, a pathloss of the second transmission beam based on the set of pathloss parameters,
   in which:
     the transmission power is determined based on the pathloss of the second transmission beam; and
     the second transmission beam is an uplink transmission beam.

4. The method of claim 3, further comprising:
   transmitting a report indicating the pathloss of the second transmission beam and an actual pathloss of the second transmission beam based on satisfying a triggering condition;
   receiving an update for estimation parameters of the pathloss estimation function based on transmitting the report; and
   updating the pathloss estimation function based on receiving the update.

5. The method of claim 4, in which the triggering condition is satisfied based on:
   receiving a request in response to the uplink transmission; or
   a difference between the pathloss of the second transmission beam and the actual pathloss being greater than a threshold.

6. The method of claim 1, in which the set of pathloss parameters further comprise one or more of a maximum permissible exposure (MPE) indication, a hardware configuration of the UE, and a transmission configuration for the uplink transmission.

7. The method of claim 1, in which:
   the set of pathloss values correspond to a first time; and
   the uplink transmission is performed at a second time after the first time.

8. The method of claim 1, further comprising:
   receiving, from a base station, a configuration for the set of DL-RSs; and
   receiving the set of DL-RSs based on receiving the configuration, each DL-RSs of the set of DL-RSs received via a respective first transmission beam of the one or more first transmission beams, the one or more first transmission beams being downlink transmission beams.

9. The method of claim 8, in which each DL-RS of the set of DL-RSs is a pathloss RS.

10. The method of claim 1, in which each DL-RS of the set of DL-RSs is received within a band that is different from a band associated with the uplink transmission.

11. The method of claim 1, in which each DL-RS of the set of DL-RSs is associated with a physical cell identifier (PCI) or a transmission configuration indicator (TCI) state that is different from a PCI or a TCI state associated with the uplink transmission.

12. An apparatus for wireless communications at a user equipment (UE), comprising:
   at least one processor;
   at least one memory coupled with the processor; and
   instructions stored in the memory and operable, when executed by the at least one processor, to cause the apparatus to:
     receive, at the UE, weights and parameters for an artificial neural network that executes a pathloss estimation function, the weights and parameters being received in accordance with transmitting a channel measurement report corresponding to one or more first downlink (DL) reference signals (RSS);
     receive, at the UE, a set of second DL-RSs associated with one or more first transmission beams;
     measure, at the UE, the set of second DL-RSs; and
     perform, at the UE, an uplink transmission via a physical uplink shared channel (PUSCH) having a transmission power that is set by the pathloss estimation function executed via the artificial neural network at the UE based on a set of pathloss parameters, the set of pathloss parameters including a set of pathloss values corresponding to measurements of the set of second DL-RSs and one or more of a timing indicator, a blockage indicator associated with blockage identified by the UE, or an indication of a second transmission beam.

13. The apparatus of claim 12, in which execution of the instructions further cause the apparatus to estimate, by the pathloss estimation function, a pathloss of the second transmission beam based on the set of pathloss parameters,
in which:
the transmission power is determined based on the pathloss of the second transmission beam; and
the second transmission beam is an uplink transmission beam.

14. The apparatus of claim 12, in which the set of pathloss parameters further comprise one or more of a maximum permissible exposure (MPE) indication, a hardware configuration of the UE, and a transmission configuration for the uplink transmission.

15. The apparatus of claim 12, in which each DL-RS of the set of DL-RSs is received within a band that is different from a band associated with the uplink transmission.

16. The apparatus of claim 12, in which each DL-RS of the set of DL-RSs is associated with a physical cell identifier (PCI) or a transmission configuration indicator (TCI) state that is different from a PCI or a TCI state associated with the uplink transmission.

\* \* \* \* \*